(12) United States Patent
Koide

(10) Patent No.: US 8,903,388 B2
(45) Date of Patent: Dec. 2, 2014

(54) COMPACT BASE STATION DEVICE AND SIGNALING METHOD

(75) Inventor: Yasuo Koide, Kanagawa (JP)

(73) Assignee: Panasonic Corporation, Osaka (JP)

( * ) Notice: Subject to any disclaimer, the term of this patent is extended or adjusted under 35 U.S.C. 154(b) by 66 days.

(21) Appl. No.: 13/813,106

(22) PCT Filed: Oct. 7, 2011

(86) PCT No.: PCT/JP2011/005658
§ 371 (c)(1),
(2), (4) Date: Jan. 29, 2013

(87) PCT Pub. No.: WO2012/046457
PCT Pub. Date: Apr. 12, 2012

(65) Prior Publication Data
US 2013/0130685 A1    May 23, 2013

(30) Foreign Application Priority Data
Oct. 8, 2010   (JP) ................................. 2010-228720

(51) Int. Cl.
| | | |
|---|---|---|
| H04W 4/00 | (2009.01) | |
| H04W 88/08 | (2009.01) | |
| H04W 24/02 | (2009.01) | |
| H04W 8/18 | (2009.01) | |
| H04W 84/04 | (2009.01) | |
| H04W 48/04 | (2009.01) | |
| H04W 60/00 | (2009.01) | |

(52) U.S. Cl.
CPC .............. *H04W 88/08* (2013.01); *H04W 24/02* (2013.01); *H04W 8/186* (2013.01); *H04W 84/045* (2013.01); *H04W 48/04* (2013.01); *H04W 60/00* (2013.01)
USPC ..................... 455/435.1; 455/561; 455/435.2; 455/552.1

(58) Field of Classification Search
CPC ..... H04W 88/08; H04W 24/02; H04W 60/00; H04W 48/04
USPC ............................................... 455/561, 535.1
See application file for complete search history.

(56) References Cited

U.S. PATENT DOCUMENTS 7,949,767 B2 *   5/2011   Jayadevan et al. ............. 709/228
8,279,807 B2 *   10/2012   Hirano et al. .................. 370/328
(Continued)

FOREIGN PATENT DOCUMENTS

| CN | 1418446 | 5/2003 |
|---|---|---|
| CN | 101827427 | 9/2010 |

(Continued)

OTHER PUBLICATIONS

International Search Report dated Nov. 15, 2011.
3GPP TS 36.300 V10.4.0, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Jun. 2011, pp. 1-193.

*Primary Examiner* — Charles Shedrick
(74) *Attorney, Agent, or Firm* — Dickinson Wright PLLC

(57) ABSTRACT

Provided is compact base station device that reduces the processing load with an upper layer network device by reducing the amount of signaling with an upper layer network device. In the device, a CSG member management device (102) stores CSG member information beforehand. A network message generation unit (107) generates a message used for collectively registering the CSG member terminals stored in the CSG member management unit (102), in an upper layer network device. At startup, a network interface unit (108) transmits a message generated by the network message generation unit (107) to the upper layer network device. In response to the message transmitted by the network interface unit (108), a network message analysis unit (106) acquires from the upper layer network device parameter information for connecting to the CSG member terminals.

8 Claims, 1 Drawing Sheet

(56) References Cited

U.S. PATENT DOCUMENTS

| | | | |
|---|---|---|---|
| 2002/0154643 A1* | 10/2002 | Satomi et al. | 370/401 |
| 2003/0013445 A1 | 1/2003 | Fujiwara | |
| 2004/0082346 A1* | 4/2004 | Skytt et al. | 455/456.3 |
| 2005/0197121 A1 | 9/2005 | Fujiwara | |
| 2008/0256220 A1* | 10/2008 | Bachmann et al. | 709/222 |
| 2008/0261592 A1* | 10/2008 | Finizole et al. | 455/435.1 |
| 2009/0007239 A1* | 1/2009 | Lindem et al. | 726/4 |
| 2009/0268669 A1* | 10/2009 | Ko et al. | 370/328 |
| 2009/0325634 A1* | 12/2009 | Bienas et al. | 455/552.1 |
| 2010/0112980 A1* | 5/2010 | Horn et al. | 455/411 |
| 2010/0190498 A1* | 7/2010 | Ha et al. | 455/435.1 |
| 2011/0319079 A1 | 12/2011 | Nakata | |
| 2012/0093168 A1* | 4/2012 | Xu et al. | 370/401 |

FOREIGN PATENT DOCUMENTS

| | | |
|---|---|---|
| EP | 1244321 | 9/2002 |
| JP | 5-145473 | 6/1993 |
| JP | 2006-157957 | 6/2006 |
| JP | 2009-260895 | 11/2009 |
| JP | 2010-213273 | 9/2010 |
| WO | 0241659 | 5/2002 |
| WO | 2010/104076 | 9/2010 |

* cited by examiner

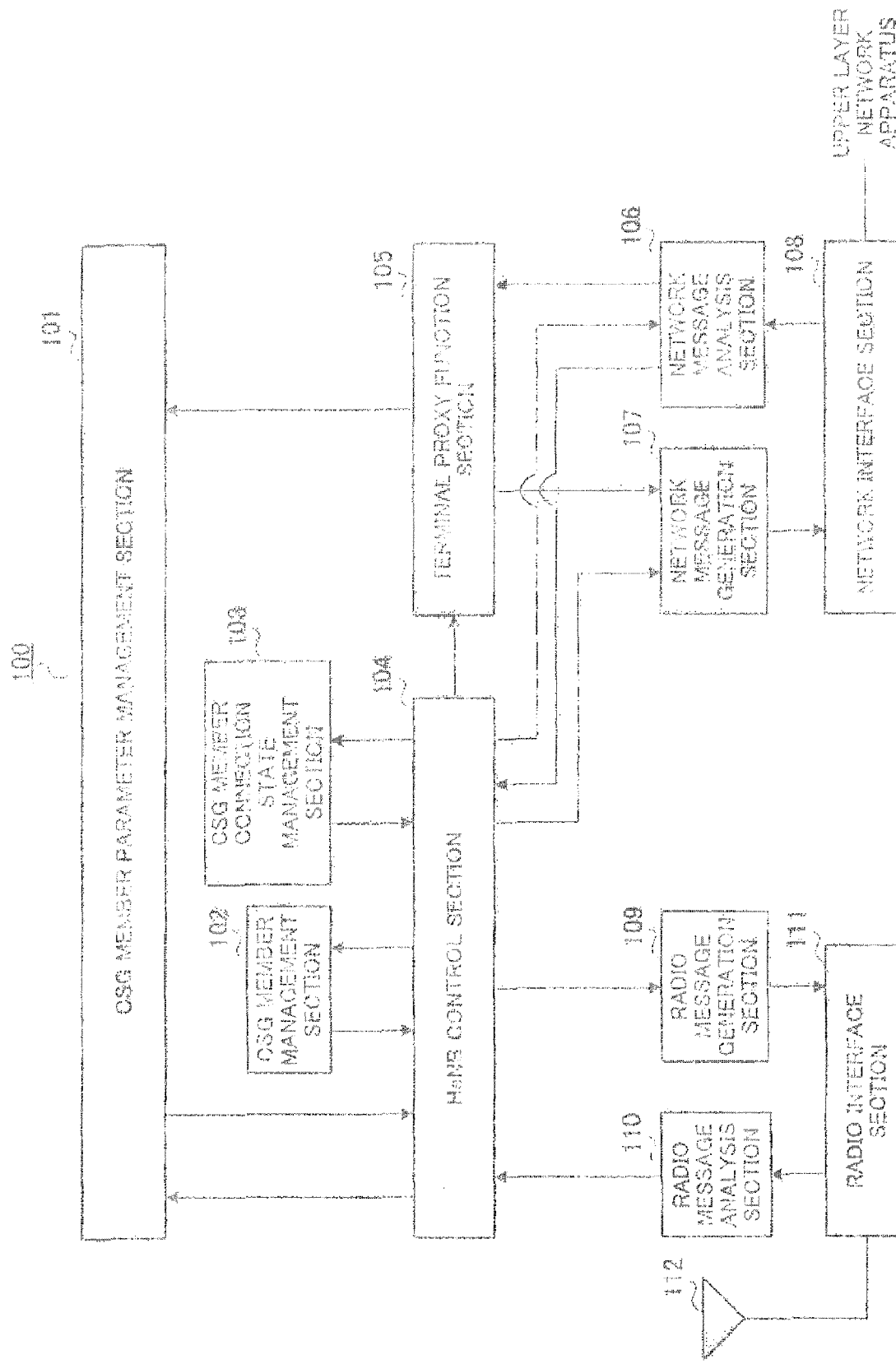

COMPACT BASE STATION DEVICE AND SIGNALING METHOD

TECHNICAL FIELD

The claimed invention relates to a small cell and a signaling method. The claimed invention relates to a small cell and a signaling method where connections are established and released for terminals within a limited area, such as a home or an office, for example.

BACKGROUND ART

In recent years, consideration has been given to installing small cells (Home NodeBs: HeNBs) within limited areas, such as homes or offices, and carrying out high-speed communications with only limited users, such as closed subscriber group (CSG) members, using those small cells. Standardization efforts regarding such small cells are being made by the 3GPP. The term CSG members, in this context, refers to grouped users managed by a small cell.

It is speculated that small cells are generally used for data communications and connected to household devices, such as personal computers, television sets, and/or the like. By being connected to a variety of such household devices, the number of connected terminals increases for small cells. This leads to the problem of increased signaling traffic for the core network to process.

It is known that a small cell gateway (HeNB GW) is sometimes disposed as an intermediate node between a small cell and an Evolved Packet Core (EPC) (e.g., NPL 1). According to NPL 1, in MME, by having a small cell gateway appear as a small cell, it is possible to keep interfaces from increasing.

CITATION LIST

Non-Patent Literature

NPL 1: 3GPP TS36.300

SUMMARY OF INVENTION

Technical Problem

However, in NPL 1, while it may be possible to keep interfaces from increasing, signaling traffic cannot be reduced since each terminal would he signaling individually. Therefore, NPL 1 has a problem in that the processing load on an upper layer network apparatus cannot be reduced.

An object of the claimed invention is to provide a small cell and a signaling method that are capable of mitigating the processing load on an upper layer network apparatus by reducing signaling traffic to/from the upper layer network apparatus.

Solution to Problem

A small cell of the claimed invention includes: a management means configured to pre-store information regarding grouped terminals; a generation means configured to generate a message for collectively registering the grouped terminals with an upper layer network apparatus; a network transmission means configured to transmit the message generated by the generation means to the upper layer network apparatus at a predetermined time; and an acquisition means configured to acquire from the upper layer network apparatus, as a response to the message transmitted by the network transmission means, a parameter for connecting with the grouped terminals.

A signaling method of the claimed invention is a signaling method for a small cell, including: a step of pre-storing information regarding grouped terminals; a step of generating a message for collectively registering the grouped terminals with an upper layer network apparatus; and a step of transmitting the generated message to the upper layer network apparatus at a predetermined time.

Advantageous Effects of Invention

According to the claimed invention, the processing load on an upper layer network apparatus may be mitigated by reducing signaling traffic to/from the upper layer network apparatus.

BRIEF DESCRIPTION OF DRAWINGS

FIG. 1 is a block diagram showing the configuration of a small cell according to an embodiment of the claimed invention.

DESCRIPTION OF EMBODIMENTS

An embodiment of the claimed invention is described in detail below with reference to the drawing.

(Embodiment)

FIG. 1 is a block diagram showing a configuration of small cell 100 according to an embodiment of the claimed invention.

Small bell 100 generally includes CSG member parameter management section 101, CSG member management section 102, CSG member connection state management section 103, HeNB control section 104, terminal proxy function section 105, network message analysis section 106, network message generation section 107, network interface section 108, radio message generation section 109, radio message analysis section 110, radio interface section 111, and antenna 112.

CSG member parameter management section 101 manages information that is necessary for radio access of CSG member terminals. Specifically, CSG member parameter management section 101 stores parameter information for CSG member terminals as notified by terminal proxy function section 105. Upon request by HeNB control section 104, CSG Member parameter management section 101 outputs stored CSG member parameter information to HeNB control section 104.

CSG member management section 102 stores CSG member information, which is information regarding CSG member terminals capable of connecting with small cell 100.

CSG member connection state management section 103 stores connection states of CSG member terminals with respect to all cell 100 as notified by HeNB control section 104. By way of example, CSG member connection state management section 103 stores connection states indicating registration or release.

Based on messages received from terminals, as well as on various information stored on CSG member parameter management section 101, CSG member management section 102, and CSG member connection state management section 103, HeNB control section 104 controls small cell 100. Specifically, HeNB control section 104 controls small cell 100 when small cell 100 is activated, when connection is established with a CSG member terminal, when connection with a CSG member terminal is released, when connection is established with a non-CSG member terminal, when connection with a non-CSG member terminal is released, or when a change is made to the CSG member terminals stored on CSG member management section 102. In so doing, HeNB control section 104 requests radio message generation section 109 or network message generation section 107 to generate a message. HeNB control section 104 acquires, from radio message analysis section 110 or network message analysis section 106, analysis information, which is an analysis result for a message received from a terminal or an upper layer network apparatus. Specific control methods at HeNB control section 104 will hereinafter be described.

Terminal proxy function section 105 operates as a proxy for a CSG member terminal to the upper layer network apparatus. Specifically, in accordance with an instruction by HeNB control section 104, terminal proxy function section 105 requests message creation, while also notifying CSG member parameter management section 101 of parameter information that is necessary in order for a terminal to connect with small cell 100.

Network message analysis section 106 analyzes messages received from the upper layer network apparatus via network interface section 108, and outputs analysis information to terminal proxy function section 105 or HeNB control section 104.

Based on information and requests received from HeNB control section 104 or terminal proxy function section 105, network message generation section 107 generates messages to be transmitted to the upper layer network apparatus. Network message generation section 107 transmits the generated messages to the upper layer network apparatus via network interface section 108.

Network interface section 108 function as an interface for the upper layer network apparatus.

Based on information and requests received from HeNB control section 104, radio message generation section 109 generates messages to be transmitted to terminals. Radio message generation section 109 transmits the generated messages to terminals via radio interface section 111 and antenna 112.

Radio message analysis section 110 analyzes messages received from terminals via antenna 112 and radio interface section 111. Radio message analysis section 110 outputs analysis information to HeNB control section 104.

Radio interface section 111 functions as an interface for terminals.

Antenna 112 transmits and receives messages, and/or the like, to and from terminals.

Operations of small cell 100 are described below.

Operations of small cell 100 are described below in the following order: (1) CSG member terminal registration operation; (2) activation operation; (3) operation to connect with CSG member terminal; (4) operation to release connection with CSG member terminal; (5) operation to connect with non-CSG member terminal; (6) operation to release connection with non-CSG member terminal; and (7) operation for when a change is made to CSG member terminals.

(1) CSG Member Terminal Registration Process

CSG member terminals are registered with small cell 100 by a user managing small cell 100. Specifically, CSG member management section 102 stores CSG member information regarding the CSG member terminals.

(2) Activation Process

HeNB control section 104 establishes connection with the upper layer network apparatus through a procedure similar to known procedures.

Once the above-mentioned connection is established, HeNB control section 104 acquires from CSG member management section 102 the CSG member information stored on CSG member management section 102 through operation (1) mentioned above.

HeNB control section 104 references the acquired CSG member information and instructs terminal proxy function section 105 to collectively register CSG member terminals with the upper layer network apparatus.

Upon receiving the above-mentioned information collective registration instruction, terminal proxy function section 105 requests network message generation section 107 to generate a collective registration message for collectively registering CSG member terminals.

Network message generation section 107 generates a collective registration message in accordance with the above above-mentioned request.

The generated collective registration message is transmitted to the upper layer network apparatus via network interface section 108.

Upon receiving the collective registration message and completing collective registration of the CSG member terminals, the upper layer network apparatus transmits to small cell 100 a connection message including a parameter that is necessary in order for the registered CSG member terminals to connect with small cell 100.

Small cell 100 receives the above-mentioned connection message via network interface section 108.

Network message analysis section 106 analyzes the received connection message, and notifies terminal proxy function section 105 of analysis information regarding the result of the analysis.

Based on the above-mentioned analysis information, terminal proxy function section 105 notifies CSG member parameter management section 101 of parameter information that is necessary in order for CSG member terminal to connect with small cell 100.

CSG member parameter management section acquires the parameter information from terminal proxy function section 105, and manages parameter information that is necessary in order for CSG member terminals to connect with small cell 100.

(3) Operation to Connect with CSG Member Terminal

Radio interface section 111 receives a connection request message from a CSG member terminal via antenna 112.

Radio message analysis section 110 analyzes the connection request message received by radio interface section 111, and notifies HeNB control section 104 of analysis information regarding the result of the analysis.

Using the above-mentioned analysis information HeNB control section 104 references the CSG member information stored on CSG member management section 102, thereby determining whether or not the terminal that transmitted the connection request message is stored on CSG member management section 102 as a CSG member.

If it is determined that the terminal is stored as a CSG member terminal, HeNB control section 104 requests CSG member parameter management section 101 to output (issue) the parameter information of the corresponding CSG member.

In accordance with the output request from HeNB control section 104, CSG member parameter management section 101 outputs the required parameter information to HeNB control section 104.

HeNB control Section 104 sends radio message generation section 109 a message generation request for message including the parameter information outputted from CSG member parameter management section 101.

HeNB control section 104 stores on CSG member connection state management section 103 the connection state of the corresponding CSG member.

Radio message generation section 109 generates a connection response message based on the message generation request from HeNB control section 104.

Via radio interface section 111 and antenna 112, the generated connection response message is transmitted to the terminal that transmitted the connection request message.

(4) Operation to Release Connection with CSG Member Terminal

Radio interface section 111 receives a release request message from a CSG member terminal via antenna 112.

Radio message analysis section 110 analyzes the release request message received at radio interface section 111, and notifies HeNB control section 104 of analysis information regarding the result of the analysis.

Using the above-mentioned analysis information, HeNB control section 104 references the CSG member information stored on CSG member management section 102, thereby determining whether or not the terminal that transmitted the release request message is stored on CSG member management section 102 as a CSG member.

If it is determined that the terminal is stored as a CSG member terminal, HeNB control section 104 references the connection states stored on CSG member connection state management section 103 and determines whether or not connection is to be released.

If it is determined that connection is to be released, HeNB control section 104 sends radio message generation section 109 a generation request for a release response message of a release response.

HeNB control section 104 also updates the corresponding CSG member terminal's connection state stored on CSG member connection state management section 103 to a connection state indicating that connection has been released.

Upon receiving the above-mentioned generation request for a release response message, radio message generation section 109 generates a release response message.

Via radio interface section 111 and antenna 112, the generated release response message is transmitted to the terminal that transmitted the release request message.

(5) Operation to Connect with Non-CSG Member Terminal

Radio interface section 111 receives a connection request message from a non-CSG member terminal via antenna 112.

Radio message analysis section 110 analyzes the connection request message received at radio interface section 111, and notifies HeNB control section 104 of analysis information regarding the result of the analysis.

Using the received analysis information, HeNB control section 104 references the CSG member information stored on CSG member management section 102, thereby determining whether or not the terminal that transmitted the connection request message is stored on CSG member management section 102 as a CSG member.

If it is determined that the terminal is not stored as a CSG member, HeNB Control section 104 determines that the terminal is a non-CSG member terminal. Using any known and ordinary connection procedure and via network message generation section 107 and network interface section 108, HeNB control section 104 then registers with the upper layer network apparatus the non-CSG member terminal that transmitted the connection request message.

The upper layer network apparatus transmits a registration notification message indicating the above-mentioned registration.

Network message analysis section 106 acquires the registration notification message via network interface section 108, and analyzes the acquired registration notification message.

Upon acquiring analysis information regarding the above-mentioned analysis from network message analysis section 106, HeNB control section 104 determines that registration with the upper layer network apparatus has been completed, and sends radio message generation section 109 a message generation request for a release response message with respect to the non-CSG member terminal.

In accordance with the message generation request from HeNB control section 104, radio message generation section 109 generates a release response message.

Via radio interface section 111 and antenna 112, the generated release response message is transmitted to the non-CSG member terminal that transmitted the connection request message.

(6) Operation to Release Connection with Non-CSG Member Terminal

Radio interface section 111 receives a release request message from a non-CSG member terminal via antenna 112.

Radio message analysis section 110 analyzes the release request message received at radio interface section 111, and notifies HeNB control section 104 of analysis information regarding the result of the analysis.

Using the analysis information, HeNB control section 104 references the CSG member information stored on CSG member management section 102, thereby determining whether or not the terminal that transmitted the release request message is stored on CSG member management section 102 as a CSG member.

If it is determined that the terminal is not stored as a CSG member, HeNB control section 104 determine that the terminal is a non-CSG member terminal. Using any known and ordinary release procedure and via network message generation section 107 and network interface section 108, HeNB control section 104 then releases connection of the non-CSG member terminal with the upper layer network apparatus.

The upper layer network apparatus transmits a release notification message indicating the above abovementioned release.

Network message analysis section 106 acquires the release notification message via network interface section 108, and analyzes the acquired release notification message.

Upon acquiring analysis information regarding the above-mentioned analysis from network message analysis section 106, HeNB control section 104 determines that release at the upper layer network apparatus has been completed, and sends radio message generation section 109 a generation request for a release response message with respect to the non-CSG member terminal.

Radio message generation section 109 generates a release response message in accordance with the generation request for a release response message.

Via radio interface section 111 and antenna 112, the generated release response message is transmitted to the non-CSG member terminal that transmitted the release request message.

(7) Operation for when a Change is Made to a CSG Member Terminal

The user managing small cell 100 registers a new CSG member terminal with small cell 100. Specifically, CSG member management section 102 stores CSG member information regarding the new CSG member terminal. In this context, conceivable circumstances where a new CSG member terminal would be registered may include cases where a terminal for use in a home or an office is newly purchased or purchased for replacement, and so forth.

HeNB control section 104 acquires from CSG member management section 102 the CSG member information regarding the new CSG member terminal. HeNB control section 104 references the acquired CSG member information, and instructs terminal proxy function section 105 to update CSG member information. In so doing, if the CSG member terminals are to be updated partially, HeNB control section 104 issues an instruction to update the CSG member information with just the newly added CSG member terminal. However, this is by no means limiting, and an instruction may instead be issued in such a manner as to update the CSG member information of all CSG member terminals including the newly added CSG member terminal.

In accordance with the above-mentioned update instruction, terminal proxy function section 105 requests network message generation section 107 to generate an update message for updating the registered CSG member terminals.

Network message generation section 107 generates an update message for the CSG member terminals in accordance with the above-mentioned request.

The generated update message is transmitted to the upper layer network apparatus via network interface section 108.

Upon completing updating the CSG member terminals, the upper layer network apparatus transmits to small cell 100 a message including a parameter that is necessary in order for the updated CSG member terminals to connect with small cell 100.

Small cell 100 receives the above-mentioned message via network interface section 108.

Network message analysis section 106 analyzes the message received at network interface section 108, and notifies terminal proxy function section 105 of analysis information regarding the result of the analysis.

From the analysis information acquired from network message analysis section 106, terminal proxy function section 105 acquires parameter information that is necessary in order for the updated CSG member terminals to connect with small cell 100, and notifies CSG member parameter management section 101 of the acquired parameter information.

If a CSG member terminal that existed before an update is deleted at CSG member management section 102, terminal proxy function section 105 acquires information regarding the deleted CSG member terminal via HeNB control section 104. Terminal proxy function section 105 then notifies CSG member parameter management section 101 to delete information regarding the deleted CSG member terminal.

Upon receiving the above-mentioned notification, CSG member parameter management section 101 deletes information regarding the deleted CSG member terminal, and manages parameter information that is necessary in order for the updated CSG member terminals to connect with small cell 100.

Thus, in the present embodiment, when updating CSG member terminals, or upon activation, a message requesting an update or collective registration of the CSG member terminals is transmitted to the upper layer network apparatus. As a result, according to the present embodiment, signaling is not performed with respect to the upper layer network apparatus with every individual request from each of the CSG member terminals. This enables a reduction in signaling traffic to/from the upper layer network apparatus, thereby mitigating the processing load on the upper layer network apparatus.

Furthermore, in the present embodiment, a parameter that is necessary for connecting with a CSG member terminal is acquired in advance from the upper layer network apparatus prior to receiving a connection request from the CSG member terminal. Thus, according to the present embodiment, when a connection request is received from a CSG member terminal, connection with the CSG member terminal may be established more quickly than is possible with related art techniques.

In the present embodiment, a message requesting an update or collective registration of CSG member terminals is transmitted to the upper layer network apparatus when updating CSG member terminals, or upon activation. However, the claimed invention is by no means limited as such, and a message requesting an update or collective registration may be transmitted to the upper layer network apparatus at any given time, such as at predetermined time intervals and/or the like.

The disclosure of the specification, drawings, and abstract of Japanese Patent Application No. 2010-228720 filed on Oct. 8, 2010, is hereby incorporated by reference in its entirety.

INDUSTRIAL APPLICABILITY

A small cell or signaling method according to the claimed invention is suitable for establishing and releasing connection with a terminal within a limited area, such as a home or an office.

REFERENCE SIGNS LIST

100 Small cell
101 CSG member parameter management section
102 CSG member management section
103 CSG member connection state management section
104 HeNB control section
105 Terminal proxy function section
106 Network message analysis section
107 Network message generation section
108 Network interface section
109 Radio message generation section
110 Radio message analysis section
111 Radio interface section
112 Antenna

The invention claimed is:
1. A small cell comprising:
a management section configured to store group information indicating grouped terminals;
a registration section configured to register each of the grouped terminals indicated by the group information with an upper layer network apparatus, regardless of whether or not the each of the grouped terminals is to be connected;
an acquisition section configured to acquire from the upper layer network apparatus, as a response to the registering, parameters for establishing a connection of each of the grouped terminals;
a reception section configured to receive a connection request from one of the grouped terminals; and
a connection section configured to establish a connection of the one of the grouped terminals based on the acquired parameter corresponding to the one of the grouped terminals, without signaling to the upper layer network apparatus.

2. The small cell according to claim 1, wherein the registration section is configured to register each of the grouped terminals at a timing of activation of the small cell.

3. The small cell according to claim 1, wherein:
the management section is configured to update the group information; and
the registration section is configured to, in response to the update of the group information, register each of the grouped terminals indicated by the updated group information with the upper network apparatus.

4. The small cell according to claim 1, wherein:
the management section is configured to update the group information; and
the registration section is configured to, in response to the update of the group information, register one or more of the grouped terminals, whose information has been updated, with the upper layer network apparatus.

5. The small cell according to claim 1, wherein the management section is further configured to store connection information indicating whether or not the connection of the each of the grouped terminals is established.

6. The small cell according to claim 5, wherein:
the reception section is further configured to receive a request for releasing the connection from one terminal among the grouped terminals; and
the management section is further configured to update the connection information to indicate that the one terminal is disconnected, without signaling the release of the connection to the upper layer network apparatus, and transmit a message indicating the connection has been released to the one terminal.

7. The small cell according to claim 1, wherein:
the reception section is further configured to receive a connection request from a non-grouped terminal which is not included in the grouped terminals; and
the connection section is further configured to, in response to the receiving or the connection request from the non-grouped terminal, request for registering the non-grouped terminal with the upper layer network apparatus before establishing the connection of the non-grouped terminal.

8. A signaling method for a small cell, comprising:
storing group information grouped terminals;
registering each of the grouped terminals indicated by the group information with an upper layer network apparatus, regardless of whether or not the each of the grouped terminals is to be connected; and
acquiring from the upper layer network apparatus, as a response to the registering, parameters for establishing a connection of the each of the grouped terminals;
receiving a connection request from one of the grouped terminals; and
establishing a connection of the one of the grouped terminals based on the acquired parameter corresponding to the one of the grouped terminals, without signaling to the upper layer network apparatus.

* * * * *